(12) United States Patent
Zhuge et al.

(10) Patent No.: US 12,392,683 B2
(45) Date of Patent: Aug. 19, 2025

(54) SAFETY APPARATUS FOR ONE DEGREE OF FREEDOM ELECTRODYNAMIC SHAKER

(71) Applicant: Sentek Dynamics Inc., Santa Clara, CA (US)

(72) Inventors: James Q. Zhuge, Palo Alto, CA (US); Michael Nichols, Charlotte, NC (US); Weijie Zhao, Los Gatos, CA (US)

(73) Assignee: Sentek Dynamics Inc., Santa Clara, CA (US)

( * ) Notice: Subject to any disclaimer, the term of this patent is extended or adjusted under 35 U.S.C. 154(b) by 312 days.

(21) Appl. No.: 18/221,827

(22) Filed: Jul. 13, 2023

(65) Prior Publication Data

US 2025/0020536 A1    Jan. 16, 2025

(51) Int. Cl.
*G01M 7/02* (2006.01)
*G01B 11/26* (2006.01)

(52) U.S. Cl.
CPC ............ *G01M 7/022* (2013.01); *G01B 11/26* (2013.01); *G01B 2210/58* (2013.01)

(58) Field of Classification Search
None
See application file for complete search history.

(56) References Cited

U.S. PATENT DOCUMENTS

| | | |
|---|---|---|
| 6,860,152 B2 | 3/2005 | Lund et al. |
| 7,320,455 B2 | 1/2008 | Ryaboy et al. |
| 8,453,512 B2 | 6/2013 | Sasso |
| 8,707,755 B2 | 4/2014 | Tezuka et al. |
| 8,893,552 B2 | 11/2014 | Hanse |
| 9,185,365 B2 * | 11/2015 | Hong ..................... H04N 7/185 |
| 11,150,160 B2 | 10/2021 | Bidwell et al. |
| 2013/0305828 A1 | 11/2013 | Alderson et al. |
| 2021/0199534 A1 * | 7/2021 | Bidwell ................ G01M 7/025 |

* cited by examiner

*Primary Examiner* — Suman K Nath
(74) *Attorney, Agent, or Firm* — Mark Protsik; Thomas Schneck

(57) ABSTRACT

Sensors outside of a control loop are used in a single axis electrodynamic shaker where an armature exerts variable amounts of vibration with a single degree of freedom on a test unit affixed to a support table. The sensors are remote from the test unit, such as laser sensors measuring movement of the test unit. Typically an array of such shakers move a support table having an affixed test unit. A controller uses inputs from the remote sensors to signal warnings of overturning moments of the support table that can damage the armatures or to shut down.

14 Claims, 5 Drawing Sheets

SAFETY APPARATUS FOR ONE DEGREE OF FREEDOM ELECTRODYNAMIC SHAKER

TECHNICAL FIELD

The invention relates to vibration test apparatus and, more particularly, to electrodynamic shaker test apparatus of the type using armatures with a single degree of freedom movement to vibrationally shake a unit under test.

BACKGROUND ART

A prior art shaker control system used in testing units of items as shown in FIG. 1 consists of the following major elements: a shaker mechanism or shaker 11 that generates vibration movement to a shaker table 13, a unit under test 15 that is affixed to the shaker table, a power amplifier 17 that drives the shaker, a controller 19 that measures the control signals from the unit under test 15 and sends out the drive signal 20 to the power amplifier 17 that drives the shaker 11. The vibration response of the unit under test 15 is then fed back to the control system controller from transducers that measure acceleration, velocity, or displacement. The controller adjusts the drive output to conform the control signal to specified characteristics in the time or frequency domain. One type of shaker 11 of the prior art that is often used is a single axis electrodynamic shaker, shown in FIG. 2, providing excitation to the unit under test, with tests often employing more than one single axis shaker.

In FIG. 2 a single axis electromagnetic shaker 11 of the prior art has a central movable armature 21, connected to a shaker table, not shown. The armature 21 moves along a single axis between iron pole pieces 22 and 24 of a magnet with the pole pieces having a gap shaped in cross section as shown to accommodate armature 21. The pole pieces 22 and 24 have cutout regions in the gap that confine annular field coils 25 and 27 that generate toroidal magnetic flux paths, shown by dashed lines 31 and 33, surrounding armature 21. The two flux paths 31 and 33 sum at a voice coil 39, reducing flux leakage toward the shaker table. The radial flux field through the armature's voice coil 39 is driven by a variable current to induce vibratory motion of the armature 21.

One degree of freedom movement along a single axis is maintained in the armature by a lower suspension 35, an upper suspension 37 and armature side wall 42 for pole piece 22 and side wall 44 for pole piece 24. The suspension and side walls guide the armature within the magnet, preventing an off-center unit under test from rocking the armature. An air spring 45 and an air chamber 47 limit armature motion away from the test unit when a drive signal reverses polarity and form an internal load support system (ILS) for the test unit using the air spring 45 to support the weight of the device under test while the armature 21 remains axially centered in its stroke range. The air spring has a pneumatic bladder filled with shop air. With an optional automatic axial centering (AAC) module, not shown, the armature mid-point position is maintained automatically.

An optional over-travel interlock prevents the armature from moving outside of its designed stroke range by interrupting the drive signal from the amplifier until the necessary corrections are made. An optional AAC performs two centering functions. First, static centering automates the pressure control of the ILS. When one changes the static payload on the load table, the ILS will operate valves to send more or less air into the air chamber connected to the air spring, changing the internal pressure to hold the armature's vertical position fixed. Second, dynamic centering provides fine tuning of the armature's center position, for example in response to temperature change, while a test is running. This is accomplished by adding a DC bias to the voice coil signal. The optional AAC is particularly desirable in operations where items of significantly different weight are tested frequently.

Larger, more powerful shakers give off more heat. Cooling of the shaker becomes essential, particularly for extended operation at high force levels. For air cooled shakers, room temperature air is drawn into the shaker through a shroud surrounding the load table. This air passes through the gap between magnet pole pieces, cooling the voice coil and the field coils as well as extracting heat from the iron pole pieces.

Large shakers, for example with force rating above 75 kN, are all water-cooled. The armature is wrapped with a flat cooling tube and the body cylinder has casting water passages. Each system is provided with a cooling unit which passes the heat generated within the shaker into a flow of outside water. Each cooling unit is sized to match the shaker and incorporates two heat exchangers, two pumps and a single divided tank for distilled water. Two internal closed loop cooling circuits provide distilled water to the armature and to the field coils. One heat exchanger and pump supplies water to the armature circuit and another heat exchanger and pump supplies water to the field circuit. An outer circuit passes the extracted heat from the inner circuits to a facility raw water source, typically from a remotely located chiller. Water pressure in the armature and field circuits is monitored by sensors as is the facility raw water pressure. If any values surpass their respective settings, the system alarm will sound and the amplifier will shut-off.

Fixtures and adapters are used to affix the test specimen or structure to the shaker. These components are designed to ensure that the test specimen is securely attached, and that the vibration is transmitted efficiently to the specimen. All such mechanical structure designs are made to ensure the armature can move up and down in a single degree of freedom, or horizontally where another degree of freedom is permitted, as much as possible while it drives a very heavy payload. Test units as small as a pencil or as large as a car or a rocket can be tested using different ratings and configurations of the shakers.

Monitoring the vibration movement of the test unit and shaker armature is based on the measurement of acceleration and force signals in a configuration as shown in FIG. 1. Controller 19 can ramp down the drive signal 20 once it detects anomaly of these monitoring signals during the test. Force monitoring from the shaker 11 to support table 13 is along line 16 while acceleration of the table is monitored along line 18, with adjustments made in the drive signal along line 20 to amplifier 17.

A prior art one dimensional electrodynamic shaker apparatus is described in U.S. Pat. No. 11,150,160 to Bidwell et al. granted Oct. 19, 2021. The Bidwell apparatus includes an inductive position displacement measurement to indicate and tune the static position of the armature, such as at a null position. The Bidwell displacement measurement is inside one of the control loops in order to tune the final position of the armature, with the displacement measurement being inside of shaker body.

Some controllers can integrate the acceleration signals into velocity and displacement in the digital domain. Due to numerical errors of integration in the digital domain, the velocity and displacement quantities obtained by digital integration are in general not accurate and are also subject to human error in the setup process. They are rarely used for actual limit checking. None of the protection techniques that have been developed target protection of the shaker armature, a difficult protection issue particularly to check when an overturning moment from load unbalance on the shaker table exceeds its allowable range leading to damaging the shaker armature or its supporting structure. Some vibration testing systems are unable to handle larger test articles and mass. The center of gravity of such test articles cannot be easily controlled which can result in high overturning moments and cause great stress on armature supports. Sometimes a large test unit can have an unbalanced center of gravity creating a very large overturning moment, which may damage the armature and its supporting structure. When the testing system has a plurality of single axis shakers to drive a large unit under test, the damage that may be caused by a high overturning moment is even more severe. This is because when two shaker driving forces are not in-phase, there will be a shearing force applied to both shakers, which causes a larger overturning moment.

SUMMARY DISCLOSURE

A configuration of a plurality of single axis shakers driving a test unit is known as a Multiple Excited Single Axis shaker configuration or MESA. In a MESA configuration, multiple single axis shakers are arranged to drive the force along one single axis with the test unit rigidly affixed to a shaker table. In a MESA shaker system, there are several possible configurations as shown in FIGS. 3, 4 and 5. In FIG. 3 two parallel, spaced apart shakers 32 and 34 are shown to have armatures contacting a shaker table 36 supporting a test unit. In FIG. 4 four parallel, spaced apart shakers 42, 44, 46 and 48 are shown to have armatures contacting a shaker table 36. In FIG. 5 two shakers 52 and 54, arranged in push-pull relationship are shown to have armatures contacting a shaker table 36. Operating a MESA configuration is more dangerous than that of single axis shaker since shakers in a MESA configuration are easier to experience overturning moments. Therefore, it is imperative to develop a method to ensure the safety of the testing system.

The present invention features a real-time processing technique having multiple displacement sensors outside of the shaker control loop to detect the linear displacement quantities of armatures for feedback control. These linear displacement quantities are used to derive the angular displacement of each armature of shakers for the control signal. Since the angular displacement is in proportion to the overturning moment, signals of angular displacement are used to indicate the severity of potential damage of the armature that can be caused by overturning moments. The angular displacement is used to create an alarm in the controller with the ability to trigger the shutdown of the drive signal. This method is proven to be effective in either a single axis shaker or a MESA configuration of shakers.

DETAILED DESCRIPTION

Figure 6:
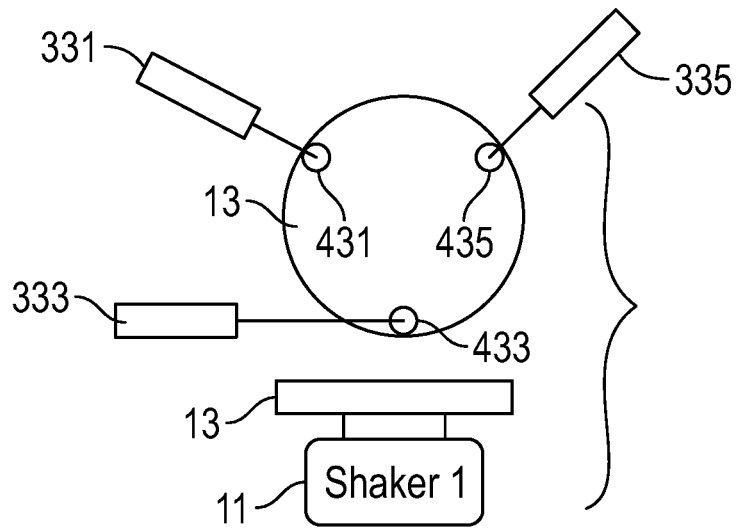
FIG. 6 is a top projection of remote sensor measurement spots on a support table with the support table projected above its horizontal position in cross-section above a support table driven by a shaker from below.

The placement of sensors outside of a control loop is critical to the success of the invention. The general guideline is that the displacement measurements must be easily convertable to linear or angular movement of the shaker armatures. In an example of a single axis shaker of FIG. 6, it is best to position three sensors measuring the far edges of a round head-expander table 13, evenly distributed. With this placement it is possible to calculate the tilting of an armature in all directions. The general guideline is that the displacement measurements must be easily convertable to the linear or angular movement of the shaker armatures. Three laser sensors 331, 333, 335 are remote from support table 13. Laser measurement spots 431, 433, 435 are evenly spaced at far edges of the support table. With this placement, it is possible to calculate the overturning or tilting of the armature in all directions. If sensor spots are too close to the center of the support table, or two of them are placed too close to each other, the estimation of the angular displacement of the support table which is fixed to the armature will have unacceptable error.

Figure 7:
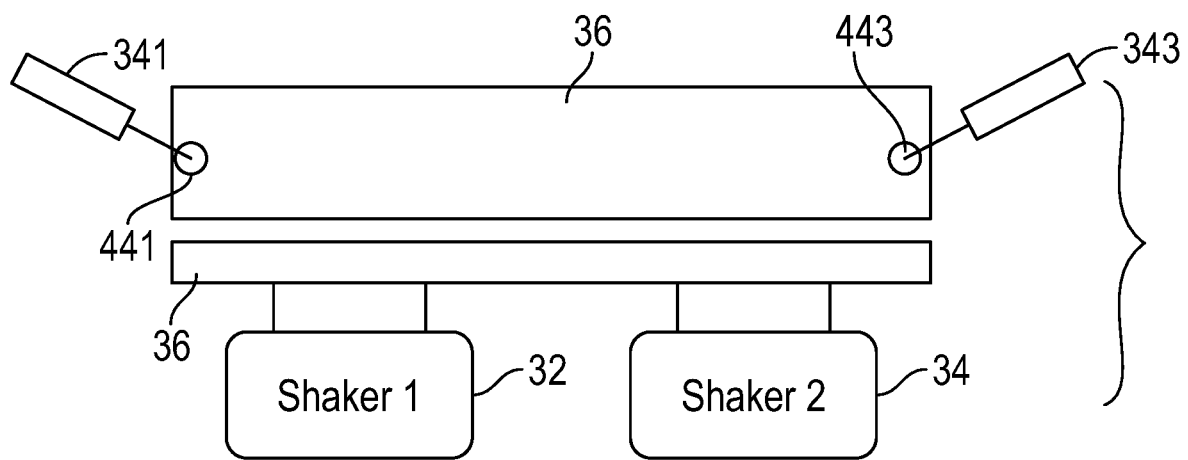
FIG. 7 is a top projection of remote sensor measurement spots on support table with the support table projected above its horizontal position in cross section above two spaced apart shakers driving the support table from below.

In a typical MESA configuration shown in FIG. 7 two shakers 32 and 34 have armatures affixed to support table 36. The biggest risk of error occurs when two shakers are running out-of-phase as when one goes up while another goes down. To prevent this situation, we want to measure the angular movement of the armature in the same direction as where two shakers are aligned. The sensors are placed with laser spots 441 and 443 near edges of the test unit 36 coming from lasers 341 and 343. Avoid placing the sensor spots towards the center of the test unit. Both linear and angular displacements are measured and calculated in real time. Thus, any alarm or abort that will be happening is instantaneous and would protect the testing system from damage due to over displacement or angular displacement.

Figure 8:
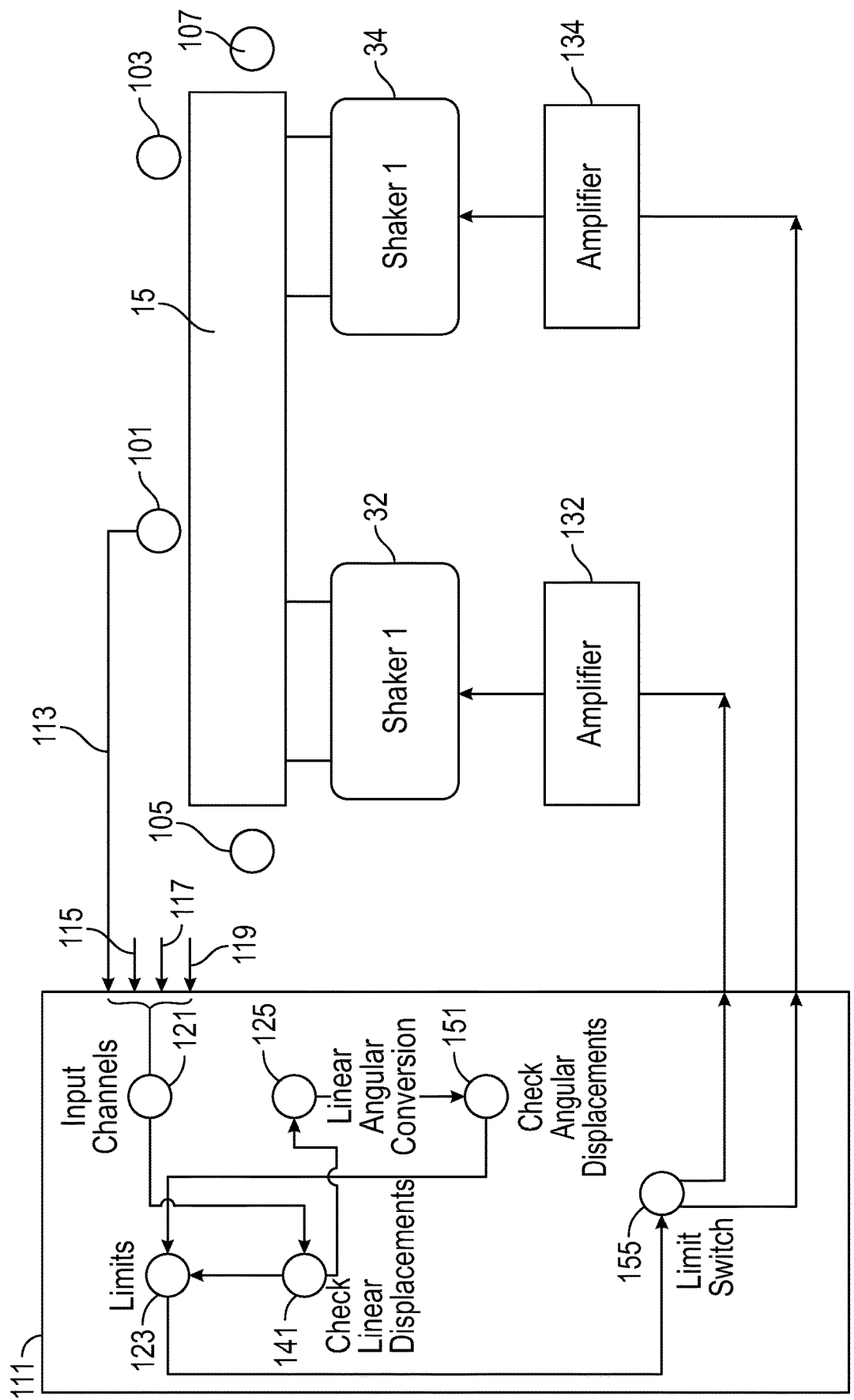
FIG. 8 is a schematic diagram of remote sensor spots measuring motion of a support table for a test unit in a control loop.

With reference to FIG. 8, a plurality of sensors 101, 103, 105 and 107 are located outside of the test unit 15 affixed to a support table and also outside of the test unit control loop directly measuring the displacement of the test unit 15. It is important that the sensors are outside of the control loop. The sensor locations can be on the test unit or support table where the linear and angular displacement of the armature can be measured. For example laser sensors spaced a distance from a test unit and aimed at the test unit can be time of flight measurement devices or other laser range finders such as multi frequency phase shift devices. A commercially available Micro Epsilon sensor is a sensor example where the sensor accurately detects linear and angular armature movement. Where the test unit experiences periodic displacement, lower frequency displacement has a higher impact on torque that the armature experiences. Preferably, the frequency range of the sensors is extended to 500 hertz and above to capture the majority of the periodic displacement that can cause torque on the armature that must be controlled for safety.

Figure 1:
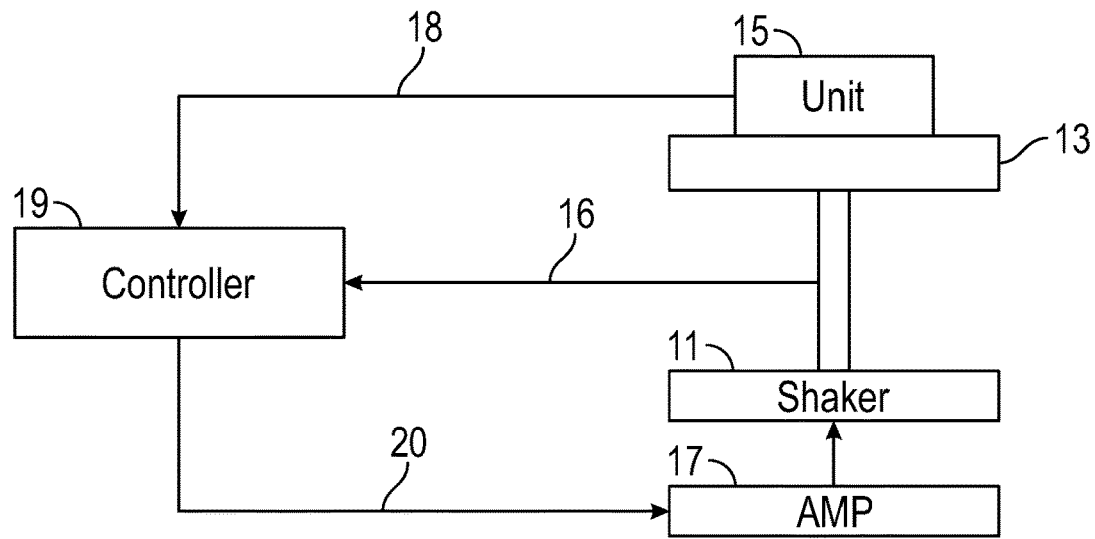
FIG. 1 is a block diagram of a prior art electrodynamic shaker test system with a single degree of freedom with a control loop to vibrationally shake a unit under test.
Figure 2:
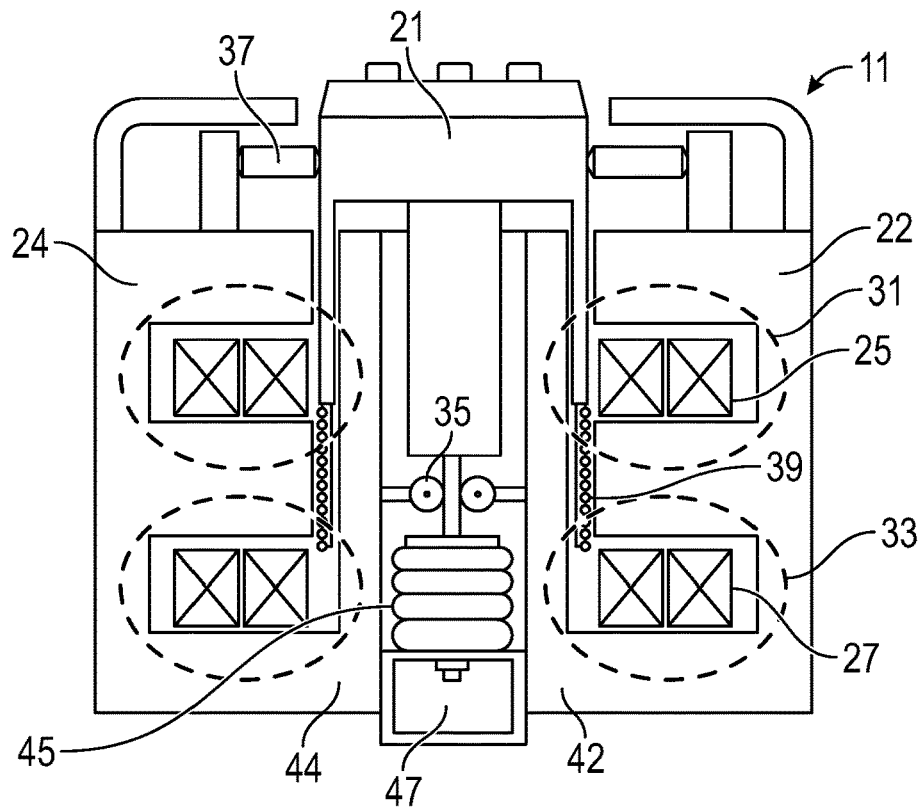
FIG. 2 is a prior art armature of the electrodynamic shaker test system of FIG. 1.
Figure 3:
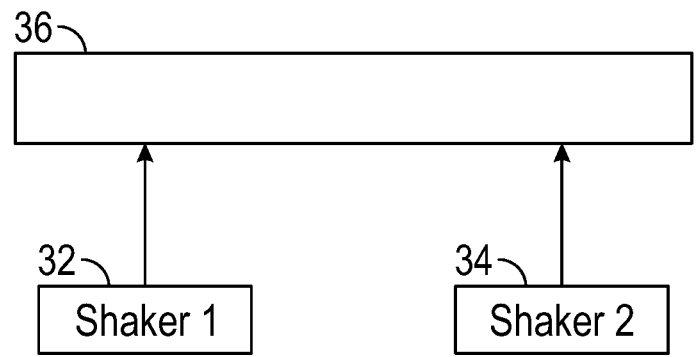
FIGS. 3, 4 and 5 are schematic diagrams of multiple excited single axis shakers (MESA configuration) driving a test unit support table.
Figure 4:
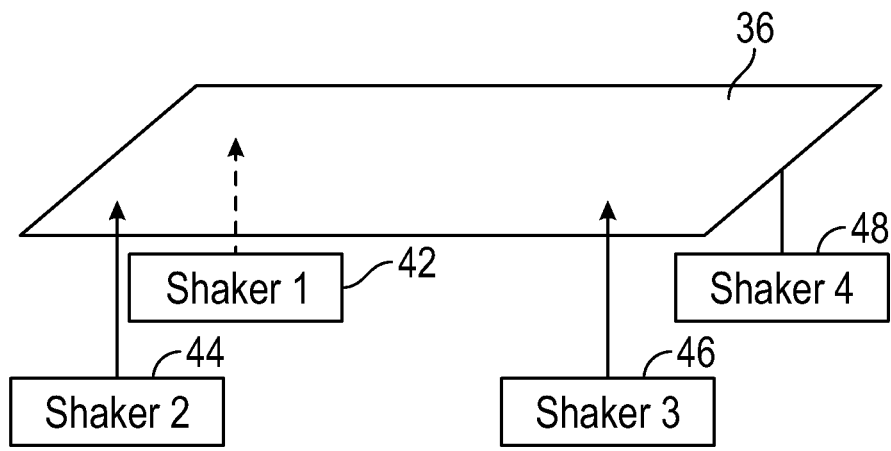
Figure 5:

Vibration controller 111 has multiple sensor input channels 113, 115, 117 and 119, with each input channel having an amplifier and ADC (Analog to Digital Converter). Each channel 121 has pre-set linear and/or angular limits 123 that are customized for each shaker setting. Two shakers 32 and 34 are shown as in FIG. 3, with a shaker table 15 having a test unit affixed. Real time software with blocks shown in controller block 111 will check the measured linear displacements in block 141 against certain shaker limits in block 123. The real time software in the controller converts two or more measured linear displacements in linear displacement block 141 to an angular displacement quantity in block 125, then checks the measured angular displacement in block 151 against certain preset limits in a limit block 123. A limit control switch 155 ramps down the drive signal to the power amplifiers 132 and 134, which drives the shakers 32 and 34 respectively. The ramping down process is controlled through the checking of either or both linear and angular displacements in blocks 141 and 151.

Figure 9:
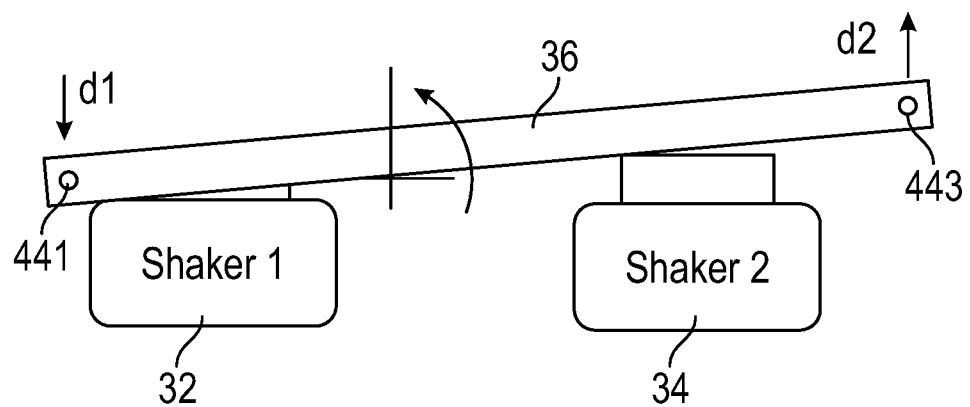
FIG. 9 is a side diagrammatic view of the two shakers of FIG. 8 in an out of phase MESA relation, overturning a support table for a test unit.

In FIG. 9 a simple example of a potentially overturning moment relies upon a pair of sensors placed at opposite ends of a support table 36 affixed to rigid body test unit. For example, the angular displacement of the test unit between two sensors at 441 and 443 can be calculated using following formula:

$$\text{Slope} = (d1 + d2)/D$$

D is the distance between the inside edges of the shaker armatures $$\text{Angle} = \text{ArcTan}((d1 + d2)/D)$$

When it is known that the test unit on the support table will tilt in one direction, two sensors are sufficient to measure angular displacement as a derived quantity, otherwise three sensors are needed. To measure armature motion perp angle calculated or derived as a quantity indicating tilt of the test unit. Laser sensor calibration is required to measure shaker table displacement. The controller transforms linear displacements of the table and hence the armature into angular displacements as derived quantities in real-time. These angular displacements are checked against certain preset limits. When the angular displacements exceed the preset limits, the controller can signal an alarm, or most often, shutdown the drive signal. By doing so, the risk of damaging expensive test units and shakers can be reduced significantly.

What is claimed is:

1. A safety system for a single axis electrodynamic shaker having an armature designed for variable amounts of vibration with a single degree of freedom movement along an axis comprising:
   a control loop including a support table and test unit connected to the shaker armature, a controller generating a drive signal to the shaker adjusting shaker vibration, an amplifier connected to receive the drive signal for exciting the shaker upon amplification, the controller receiving an input from the shaker representing shaker vibrational motion;
   a plurality of displacement sensors outside of the control loop and remote from the support table and test unit, the sensors measuring dynamic linear displacement quantities of the test unit and reporting displacements and their derived quantities to the controller;
   a detection signalling mechanism in the controller to compare if the displacements or their derived quantities are over the preset limits based upon displacement quantities reported from the sensors; and
   an alarming or shutdown mechanism to ramp down the drive signal of the controller based on the detection signal.

2. The apparatus of claim 1 wherein the sensors are laser sensors.

3. The apparatus of claim 2 wherein the laser sensors comprise at least two sensors directed at spaced apart regions along the periphery of a support table.

4. The apparatus of claim 3 wherein the support table is a round support table.

5. The apparatus of claim 1 wherein the armature moves between pole pieces of a magnet.

6. The apparatus of claim 5 wherein the pole pieces have cutout regions that retain annular field coils.

7. The apparatus of claim 6 wherein the annular field coils generate toroidal magnetic fields that merge in a voice coil axially surrounding the armature.

8. The apparatus of claim 1 wherein the armature has motion limited in one direction by an air spring.

9. The apparatus of claim 1 wherein an upper suspension guides the armature for motion with a single degree of freedom.

10. The apparatus of claim 1 wherein a lower suspension guides the armature for motion with a single degree of freedom.

11. A safety system for a plurality of single axis electrodynamic shakers, each shaker having an armature designed for variable amounts of vibration with a single degree of freedom movement along an axis comprising:
    a control loop including a support table and test unit connected to armatures of the shakers, a controller generating a drive signal to each shaker exciting shaker vibration, an amplifier connected to receive the drive signal for relay to the shakers upon amplification, the controller receiving an input from the shakers representing shaker vibrational motion;
    a plurality of displacement sensors outside of the control loop and remote from the support table and test unit, the sensors measuring dynamic linear displacements and derived quantities of the test unit and reporting displacements and derived quantities to the controller; and
    a switch in the controller to ramp down the drive signal above a preset limit based upon vibration reported displacements and their derived quantities.

12. The apparatus of claim 11 where in the sensors are arranged to report angular motion of the support table deviating from said single axis wherein said angular motion can activate said switch.

13. The apparatus of claim 12 wherein the laser sensors comprise three sensors directed at spaced apart regions along the periphery of a support table.

14. A method for protecting an armature in a single axis electrodynamic shaker at least partially supporting a test unit with a single degree of freedom movement comprising:
    providing a variable drive signal to an armature at least partially supporting a test unit, the drive signal being controlled in a control loop;

remotely sensing test unit displacement quantities outside of the drive signal control loop and producing corresponding sense signals;

deriving dynamic linear displacement quantities of the test unit that indicates an angular overturning of the test unit from the sense signals; and signalling an alarm or shutdown of the drive signal to the armature in response to angular overturning of the test unit.

* * * * *